April 9, 1929. L. BERTELE 1,708,863
PHOTOGRAPHIC OBJECTIVE
Filed April 21, 1925

Inventor
Ludwig Bertele.
William C. Linton
Attorney.

Patented Apr. 9, 1929.

1,708,863

UNITED STATES PATENT OFFICE.

LUDWIG BERTELE, OF DRESDEN, GERMANY.

PHOTOGRAPHIC OBJECTIVE.

Application filed April 21, 1925, Serial No. 24,888, and in Germany December 5, 1924.

The present invention relates to an improvement of lenses consisting of three collective members embracing a negative member in such a way that two collective members are placed before the negative member and a collective member behind the negative member.

According to the invention, this construction is improved by forming one of the members, either the dispersive member or any one of the three collective members, of three single lenses cemented or otherwise intimately associated together, thus forming a triplet which presents two surfaces. The character of the three lenses forming this triplet are such that the two surfaces presented act in a chromatically opposite direction, that is, one in the direction of chromatic over correction and the other in the direction of chromatic under correction. This arrangement leads to quite unexpected results.

Referring more specifically to the drawings, $l_1$, $l_2$ and $l_3$ designate spaces between the lenses. $r_1$ to $r_{10}$ inclusive designate the radii of curvature of the surfaces of various lenses; and $d_1$ to $d_6$ inclusive designate the thicknesses of the lenses.

Figure 1:
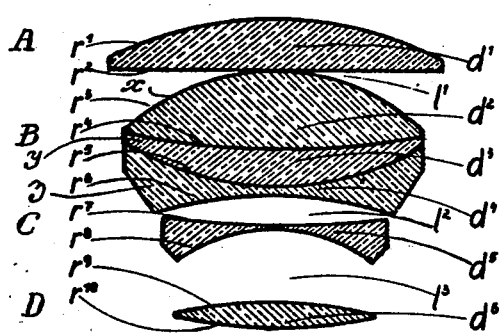
Figs. 1 and 2 are sections of lenses wherein the three cemented lenses occur in one of the collective members, this collective member being placed between the dispersive member and another collective member.
Figure 2:
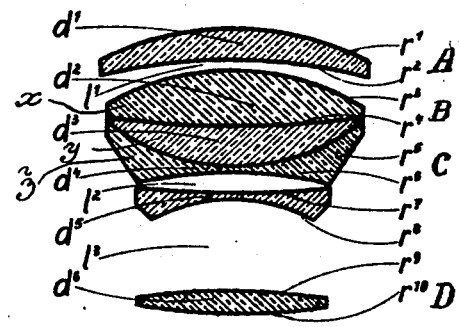

The lens shown in Figs. 1 and 2 is composed of four members A, B, C and D. The first or front member A is a single collective lens. The second member B is a member composed of three single lenses $x$, $y$ and $z$, cemented together or otherwise intimately associated and presenting two surfaces of which $r_4$ and $r_5$ designate the radii of curvature. $x$ and $y$ are collective lenses and $z$ is a dispersive lens. The refractive indices of $x$, $y$ and $z$ are such that the two surfaces presented will be chromatically antagonistic, that is, the combination of $x$ and $y$ will produce an under correction and $y$ and $z$ will produce an over correction.

The third member C is a single dispersive lens, while the fourth member D is a single collective lens.

Figure 3:
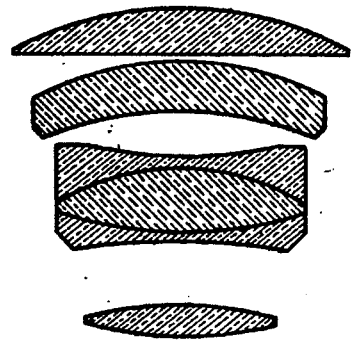
Fig. 3 is a section of a lens wherein the three cemented lenses occur in the dispersive member.
Figure 4:
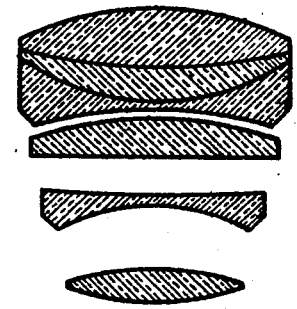
Fig. 4 is a section of a lens wherein the three cemented lenses occur in the front collective member.

Figs. 3 and 4 show other modifications of the invention. In Fig. 3 the three lenses cemented or otherwise associated together are included in the dispersive member, and on one side thereof two collective members are positioned and upon the other side is positioned a single collective lens.

The modification shown in Fig. 4 is similar to the modification shown in Fig. 1 with the exception that the relative positions of the members A and B shown in Fig. 1 have been interchanged.

By the arrangement of lenses described the former rapidity of 1:2 can be considerably raised and thus the angle of view, with sharp definition even up to the edges, can be made about 50° in comparison with 40° in known constructions. By rapidity referred to above I mean the ratio of the diameter of the first lens of the combination shown to the focal length of said combination. In this case, considerably less glass is needed than in lenses of different lens succession with anastigmatic flattening of the image field, at the same output. As the absorpton of the violet rays in case of greater lens thicknesses makes itself felt very strongly and as in the new construction the thicknesses of lenses at increased output (angle of image) become considerably smaller a greater brightness at equal ratio of aperture will be obtained.

The examples indicated herein prove the great progress over former constructions. Example I (Fig. 1) shows a ratio of aperture of 1:1,5; example II (Fig. 2) shows a ratio of aperture of 1:1,8 with an angle of image of 50°. For the sake of convenience, the two cemented surfaces in the two present examples are placed in the second collective lens. In Figures 3 and 4, the other possibilities are represented only figuratively.

In order to obtain a specially favorable sphero-chromatic correction free from zones, the glass of the various lenses in the examples has been selected in such a way that one pair of the cemented surfaces is acting in the direction of chromatic over-correction and the other pair of cemented surfaces in the direction of chromatic under-correction. It is, however, not absolutely necessary that the pairs of the cemented surfaces are acting in the indicated way.

I claim:

1. A lens comprising three collective members and a dispersive member, two of said collective members being placed before the negative member and the other of said collective members being placed behind the negative member, one of said members comprising three lenses cemented together forming two surfaces acting in chromatically opposite directions.

2. A lens comprising at least three collective members and a dispersing member, said dispersing member being placed between two of said collective members, one of the members comprising three lenses and a pair of surfaces one of which acts in the direction of chromatic over-correction and the other of which acts in the direction of chromatic under-correction.

3. A lens comprising at least three collective members and a dispersing member, said dispersing member being placed between two of said collective members, one of the members comprising three lenses, two of which are respectively collective and dispersing lenses.

4. A lens comprising a plurality of collective members and a dispersing member, said dispersing member being placed between two of said collective members, one of the members comprising three lenses, two of which are respectively collective and dispersing lenses and forming with the third lens two surfaces chromatically antagonistic.

5. A lens comprising three collective members and a dispersing member, two of said collective members being positioned before and the other of said collective members being positioned behind the dispersing member, one of said collective members comprising three lenses.

6. A lens comprising three collective members and a dispersing member, one of said collective members being positioned between a dispersing member and a collective member and comprising three lenses.

7. A lens according to claim 6 wherein the last mentioned collective member comprises a dispersing lens and two collective lenses.

8. A lens comprising three collective members and a dispersing member, one of said collective members being positioned between a dispersing member and a collective member and comprising three lenses and having two such surfaces that one thereof acts in the direction of chromatic over correction and the other thereof acts in the direction of chromatic under correction.

9. A lens comprising six members in order as follows: a front collective member, a second collective member comprising three lenses whose surfaces are intimately associated, a dispersing member and a third collective member.

10. A lens according to claim 9 wherein the three lenses of the second collective member comprise a dispersing lens and two collective lenses.

11. A lens according to claim 9 wherein the three lenses forming the second collective member present two surfaces which are chromatically antagonistic.

In witness whereof I have hereunto set my hand.

LUDWIG BERTELE.